United States Patent [19]

Honjo et al.

[11] Patent Number: 4,611,248
[45] Date of Patent: Sep. 9, 1986

[54] ROTARY RECORDING MEDIUM AND REPRODUCING APPARATUS THEREFOR

[75] Inventors: Yoshihiko Honjo, Ayase; Hisayoshi Yamada, Kamakura; Kazuhiro Hosono, Yokohama; Masaki Sakurai, Yokohama; Ryozo Abe, Yokohama; Kenji Yoshihara, Chiba, all of Japan

[73] Assignee: Victor Company of Japan, Ltd., Yokohama, Japan

[21] Appl. No.: 758,564

[22] Filed: Jul. 24, 1985

Related U.S. Application Data

[63] Continuation of Ser. No. 394,317, Jul. 1, 1982, abandoned.

[30] Foreign Application Priority Data

Jul. 6, 1981 [JP] Japan ................ 56-105361
Jul. 6, 1981 [JP] Japan ................ 56-105362

[51] Int. Cl.$^4$ ............................................ H04N 5/91
[52] U.S. Cl. ......................... 358/342; 360/10.1; 360/19.1; 360/37.1; 358/312; 358/343
[58] Field of Search ............ 360/10.1, 72.2, 74.1, 360/19.1, 14.1, 14.2, 14.3, 37.1; 358/342, 312, 343; 369/30, 32, 126

[56] References Cited

U.S. PATENT DOCUMENTS

| 3,721,757 | 3/1973 | Ettlinger | 360/14.3 |
|---|---|---|---|
| 4,317,131 | 2/1982 | Jerome | 358/342 |
| 4,361,849 | 11/1982 | Bolger | 360/10.1 |
| 4,417,285 | 11/1983 | Mes | 360/10.1 |
| 4,433,347 | 2/1984 | Sugiyama | 358/342 |
| 4,460,927 | 7/1984 | Romeas | 360/10.1 |
| 4,477,843 | 10/1984 | Kinjo | 360/10.1 |

FOREIGN PATENT DOCUMENTS

| 0025277A2 | 8/1980 | European Pat. Off. | 358/343 |
|---|---|---|---|
| 0024858A2 | 3/1981 | European Pat. Off. | 360/72.2 |
| 2621995 | 12/1977 | Fed. Rep. of Germany | 369/111 |
| 2118657 | 8/1979 | Fed. Rep. of Germany | 369/111 |
| 2809490 | 12/1979 | Fed. Rep. of Germany | 358/342 |
| 3039259 | 5/1981 | Fed. Rep. of Germany | 358/907 |
| 1519974 | 8/1978 | United Kingdom | 358/907 |
| 2016785A | 9/1979 | United Kingdom | 360/10.1 |
| 2082823A | 3/1982 | United Kingdom | 360/10.1 |
| 2086083A | 5/1982 | United Kingdom | 360/10.1 |
| 2097987A | 11/1982 | United Kingdom | 360/10.1 |

OTHER PUBLICATIONS

A Random Access System Adapted for the Optical Videodisc: Its Impact on Information Retrieval by Mathieu, Journal of SMPTE, pp. 80-83, Feb., 1977.

Primary Examiner—Alan Faber
Attorney, Agent, or Firm—Louis Bernat

[57] ABSTRACT

A rotary recording medium recorded with an information signal including a video signal along a spiral track thereon, and from which the recorded information signal is reproduced by a reproducing apparatus in which a reproducing element scans over the spiral track, is further recorded with a stop signal on a track turn recorded with an information signal which is to be reproduced repeatedly for a predetermined time period so that the reproducing element repetitively reproduces the track turn for the predetermined time period. The reproducing apparatus comprises a stop signal detection circuit for detecting the stop signal from a signal reproduced by the reproducing element, and a circuit responsive to the stop signal detected by the stop signal detection circuit, for causing repetitive reproduction of a predetermined track turn recorded with the stop signal. The still picture reproduction is performed by repetitively reproducing the information signal recorded on a track turn recorded with the stop signal.

5 Claims, 9 Drawing Figures

ROTARY RECORDING MEDIUM AND REPRODUCING APPARATUS THEREFOR

This is a Continuation Application of U.S. patent application Ser. No. 394,317, filed July 1, 1982, now abandoned entitled "ROTARY RECORDING MEDIUM REPRODUCING APPARATUS THEREFOR".

BACKGROUND OF THE INVENTION

The present invention generally relates to rotary recording mediums and reproducing apparatuses therefor, and more particularly to a rotary recording medium capable of recording still picture information with increased recording capacity and providing fine still picture reproduction, and a reproducing apparatus for reproducing such a rotary recording medium.

Generally, a program information recorded onto a rotary recording medium (hereinafter simply referred to as a disc) is not limited to an information containing all moving pictures, but can be an information including still pictures among moving pictures. For example, in a program containing a golf lesson, titles such as "driver shot" and "bunker shot" are succeeded by the actual shots. In this case, the titles are still pictures, and the actual shots are moving pictures. When recording such a program information signal onto the disc, the still pictures are recorded on a plurality of tracks if the recording is performed under a constant speed to carry out a normal recording without discriminating the moving pictures and the still pictures. Hence, the recording range of the disc cannot be used effectively by this method, and is uneconomical. Accordingly, in order to improve the recording density, it becomes desirable to record one still picture on one track and record the moving pictures by normal recording, among the still and moving pictures.

In a reproducing apparatus for reproducing the above disc, it becomes necessary to discriminate whether the track being reproduced contains a still picture or a moving picture. With respect to a track recorded with the still picture, it is necessary to reproduce the track repeatedly for a plurality of times.

In addition, when reproducing a still picture track, there are cases where the operator wishes to skip over the still picture track by carrying out normal reproduction without carrying out still picture reproduction with respect to this still picture track in order to carry out still picture reproduction with respect to a different track. In such cases, it becomes necessary to discriminate the above different track.

Reproducing apparatuses for reproducing a disc of the electrostatic capacitance type have previously been proposed, such as the apparatuses disclosed in the U.S. Pat. Nos. 4,322,836 and 4,331,976 in which the assignee is the same as that of the present application. These previously proposed reproducing apparatuses comprise a reproducing stylus as a reproducing element for sliding and scanning over tracks on the disc to reproduce the recorded information signal as variations in the electrostatic capacitance. In such a reproducing apparatus, a track will become worn due to friction if this track is repeatedly reproduced for a long period of time due to the sliding contact between the reproducing apparatus, and this will shorten the serviceable life of the disc. Accordingly, if one still picture is recorded onto one track regardless of how long the reproducing time for this still picture is, improvements can be made with respect to the recording density, however, the serviceable life of the disc may be shortened by the still picture reproduction in the above reproducing apparatus.

SUMMARY OF THE INVENTION

Accordingly, it is a general object of the present invention to provide a novel and useful rotary recording medium and reproducing apparatus therefor, in which the above described demands have been satisfied and the problems overcome.

Another and more specific object of the present invention is to provide a rotary recording medium in which a stop code is recorded on at least one or a plurality of tracks together with an information signal, and the stop code is not provided within a signal section which is to be reproduced by an arbitrary mode so that only the information signal within that signal section is recorded, and a reproducing apparatus for reproducing such a rotary recording medium. According to the rotary recording medium of the present invention, the track recorded with the stop code is automatically reproduced repeatedly for a predetermined time period. Thus, it is only necessary to record the still picture information over one or a small number of tracks, and increases the recording capacity (that is, reproducing time) of the rotary recording medium. If the same information is recorded over two or more tracks together with the stop code, the same information is continuously reproduced for a time period twice the length of the above predetermined time period. In this case, even when the rotary recording medium is reproduced by a reproducing stylus which slides over and scans over the rotary recording medium in a contacting state, the wear due to friction in the tracks recorded by the above same information is negligible, because the repetitive reproduction of the same track is only carried out for the predetermined time period which is a short duration such that wear due to friction does not become a problem. Further, by selecting the number of tracks on which the stop code is to be recorded at the signal recording side, it becomes possible to arbitrarily control the reproducing time of the still picture.

Still another object of the present invention is to provide a reproducing apparatus for reproducing a rotary recording medium in which, when there is an incoming stop cancel signal, each track is reproduced by an arbitrary mode until a track recorded with the stop code and immediately succeeding a track not recorded with the stop code is reproduced. According to the reproducing apparatus of the present invention, it is possible to discontinue reproduction with respect to the track which is being reproduced repeatedly to immediately perform repetitive reproduction of a different track recorded with the stop code, by the stop cancel signal.

Another object of the invention is to provide a reproducing apparatus capable of selectively performing usual reproducing operations not using the stop code according to the operator's will, by selecting a reproducing operation by a switch from among a reproducing operation in which the track recorded with the stop code is repeatedly reproduced and a reproducing operation in which each track is reproduced by the same mode regardless of whether the stop code is recorded on the track or not.

Other objects and further features of the present invention will be apparent from the following detailed description when read in conjunction with the accompanying drawings.

DETAILED DESCRIPTION

Figure 1:
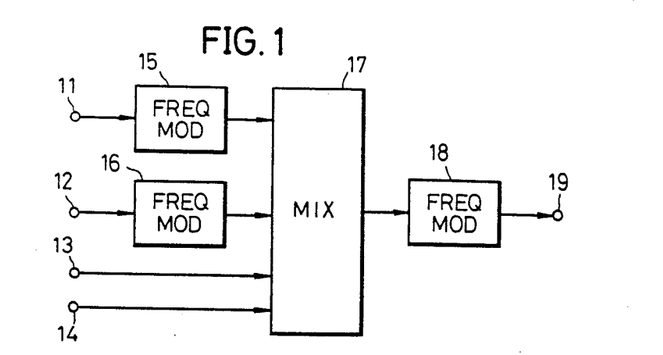
FIG. 1 is a systematic block diagram showing an embodiment of an essential part of a recording system for a rotary recording medium according to the present invention.

In FIG. 1, audio signals of a first channel and a second channel are respectively applied to input terminals 11 and 12. The input terminals 11 and 12 may simultaneously be applied with monaural audio signals from a single program source, separately applied with stereo audio signals of a right channel and a left channel, or separately applied with mutually different kind of audio signals (for example, one audio signal in Japanese and the other audio signal in a foreign language). A video signal is applied to an input terminal 13. An address signal which assumes two values to enable discrimination of a recorded position on a disc, is applied to an input terminal 14.

The first-channel audio signal applied to the input terminal 11 is supplied to a frequency modulator 15 wherein a carrier of a predetermined frequency (3.43 MHz, for example) is frequency-modulated, to form a first-channel FM audio signal. On the other hand, the second-channel audio signal simultaneously applied to the input terminal 12 is supplied to a frequency modulator 16 wherein a carrier of 3.73 MHz, for example, is frequency-modulated, to form a second-channel FM audio signal. These first-channel and second-channel FM audio signals are respectively supplied to a mixing circuit 17 wherein these FM audio signals are multiplexed with the video signal from the input terminal 13 and the address signal from the input terminal 14. Here, measures are taken so that the band of the video signal from the input terminal 13 does not overlap with the band of the first-channel and second-channel FM audio signals. For example, the video signal is a composite color video signal in which a luminance signal is band-limited to an extent where the upper limit frequency is approximately 3 MHz, and a carrier chrominance signal which is frequency-converted into a low band is multiplexed into a high frequency range of the band-limited luminance signal.

Figure 3A:
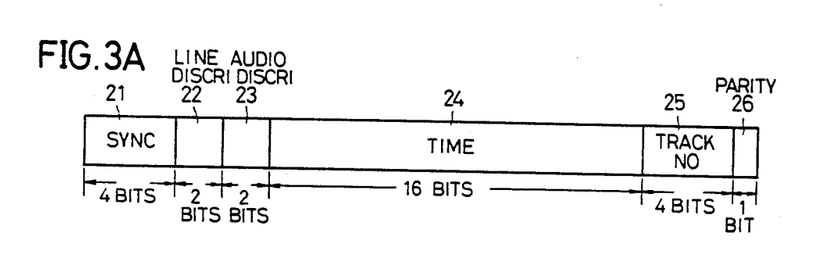
FIGS. 3A and 3B respectively show the construction of address signals including a stop code which are recorded onto a rotary recording medium according to the present invention.
Figure 3B:
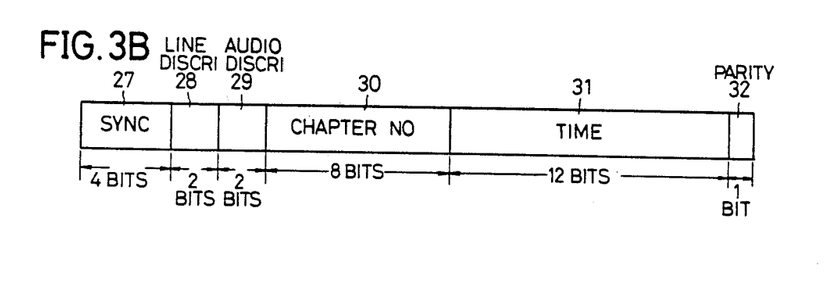

The address signal is applied to the input terminal 14 during a period corresponding to a predetermined 2H (H indicates a horizontal scanning period) within a vertical blanking period of the video signal applied to the input terminal 13. The address signal consists of a time address signal and a chapter address signal. FIG. 3A shows the time address signal for mainly indicating a reproducing time from a first recording position in a program recording section on the disc. This time address signal consists of a 4-bit synchronization code 21, a 2-bit line discrimination code 22, a 2-bit audio discrimination code 23, a 16-bit time discrimination code 24, a 4-bit track discrimination code 25, and a 1-bit parity bit 26. On the other hand, FIG. 3B shows the chapter address signal for mainly indicating the order of the recorded programs on the same recording surface of the disc. This chapter address signal consists of a 4-bit synchronization code 27, a 2-bit line discrimination code 28, a 2-bit audio discrimination code 29, an 8-bit chapter number discrimination code 30, a 12-bit time discrimination code 31, and a 1-bit parity bit 32.

The synchronization codes 21 and 27 are identical codes, and indicate the beginning of the address signal. The line discrimination codes 22 and 28 indicate the number of the horizontal scanning line within the vertical blanking period of the video signal which is multiplexed with the address signal. For example, if the recorded video signal is of the NTSC system, the time address signal shown in FIG. 3A is transmitted in a state multiplexed into each horizontal scanning period of the 18th and 281st horizontal scanning lines (that is, with one horizontal scanning period from a point in time when the 9th horizontal synchronizing signal is obtained, after an equalizing pulse which follows a vertical synchronizing pulse together with each odd and even fields). In addition, the chapter address signal shown in FIG. 3B is transmitted in a state multiplexed into one horizontal scanning period immediately before the transmission period of the above time address (that is, the 17th and 280th horizontal scanning lines), for example. Accordingly, the code contents of the line discrimination codes 22 and 28 respectively differ.

The audio discrimination codes 23 and 29 are codes for mainly discriminating the kind of recorded audio signal. As will be described hereinafter, these codes are used as stop codes which constitute an essential part of the present invention only when these codes assume a predetermined value. The time discrimination code 24 indicates the reproducing time from the first recording position within the recorded program section, and is capable of indicating up to 59 minutes and 59 seconds at the maximum. The track discrimination code 25 is a code for discriminating the number of tracks reproduced within one second. A disc recorded with a video signal of a field frequency 60 Hz at a rate of four fields for one revolution of the disc, for example, together with the audio signal, is reproduced by rotating the disc at a speed of 15 revolutions per second. Accordingly, it becomes necessary to discriminate which track is being reproduced from among the 15 tracks, within the same one second. This is the reason why the above track discrimination code 25 is provided.

The chapter number discrimination code 30 is a code for indicating the order of the recorded program. For example, this chapter number discrimination code 30 is capable of indicating up to 99 chapter numbers at the maximum. The time discrimination code 31 indicates the time from the beginning of each recorded program having the chapter number indicated by the chapter number discrimination code 30, in terms of seconds.

The multiplexed signal obtained from the mixing circuit 17 shown in FIG. 1 is supplied to a frequency modulator 18 wherein the multiplexed signal is frequency-modulated to a signal having a carrier deviation band width of 6.1 MHz to 7.9 MHz, for example. The output of the frequency modulator 18 is produced through an output terminal 19 as a main information signal.

As described in detail in the U.S. Pat. No. 4,331,976 in which the assignee is the same as that of the present application, the above main information signal is applied to an optical modulator (not shown), for example, wherein a lazer light is modulated into a modulated light beam. This modulated light beam is condensed on a photosensitive agent covering an original disc undergoing synchronous rotation. The original disc is subjected to the known developing process, to form a main track comprising rows of intermittent pits according to the repetition frequency of the main information signal. Accordingly, the video signal and the 2-channel audio signal are simultaneously recorded on one main track. On the other hand, reference signals fp1 and fp2 for tracking control which will be described hereinafter, are applied to another optical modulator (not shown). Similarly, a lazer light is modulated to obtain a modulated light beam, to form a sub track comprising rows of intermittent pits simultaneously with the forming of the main track. Discs are duplicated from the above recorded original disc, through the known stamping process.

Figure 2:
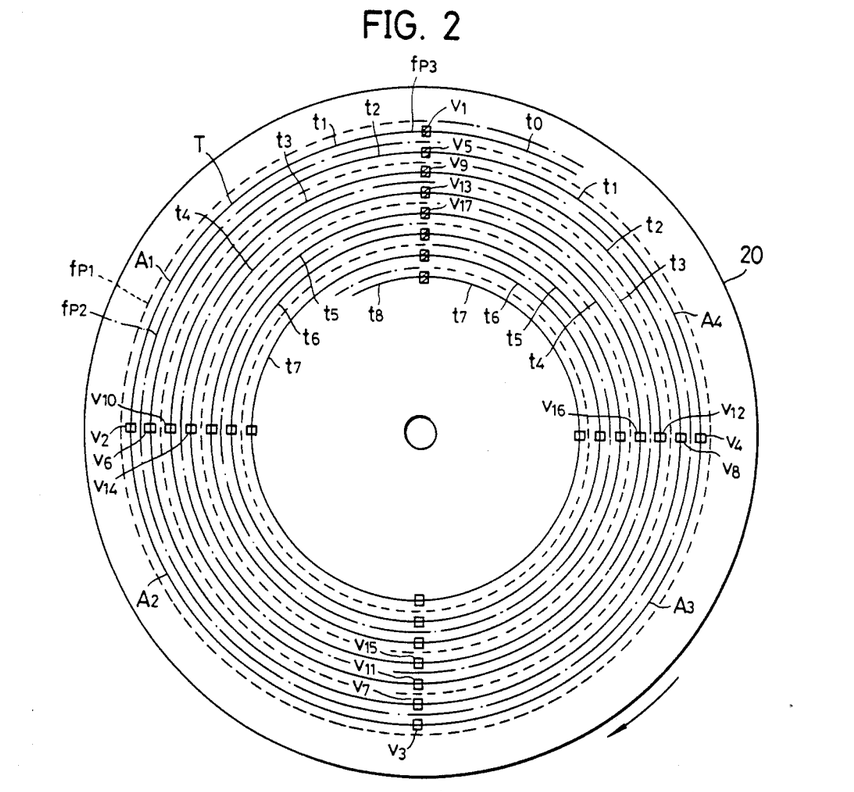
FIG. 2 is a diagram showing a track pattern on a rotary recording medium.

A track pattern on a disc recorded in the above described manner, is shown in FIG. 2.

On a disc 20, as indicated in FIG. 2, the video signal and the audio signal are recorded along a spiral track T for two frames, that is, four frames, for one revolution of the disc 20. In FIG. 2, the tracks of the reference signal fp1 is shown by dotted lines while the reference signal fp2 is shown by one-dot chain lines. The positions of the vertical synchronizing signals of respective fields are designated by references characters V1, V2, V3, . . . , and the successive track parts corresponding to one revolution of the disc of a single spiral track T is designated by track turns t1, t2, t3, . . . . Furthermore, a third reference signal fp3 is recorded at the starting end positions V1, V5, V9, . . . of each of the track turns t1, t2, t3, . . . , that is, at positions where the reference signals fp1 and fp2 change over. A video signal of four fields, namely A1, A2, A3, and A4, is recorded on the track t1.

Pits having lengths differing according to the wavelength of the main information signal obtained from the output terminal 19, are intermittently formed on the spiral track T, but grooves for guiding a reproducing stylus are not provided in the disc. The disc 20 has an electrode function so that the information can be obtained as variations in the electrostatic capacitance between an electrode of the reproducing stylus which will be described hereinafter and the disc. Further, in the present embodiment of the invention, the stop code is referred to a code obtained when the audio discrimination code 23 in the time address signal shown in FIG. 3A and the audio discrimination code 29 in the chapter address signal shown in FIG. 3B respectively assume a predetermined value. If the video signal to be recorded has a signal section which is to be reproduced by normal reproduction, the above stop code is not recorded within that signal section. The stop code is only recorded within a signal section which is to be reproduced continuously for a predetermined time period.

Hence, according to the disc of the present invention, the stop code may be recorded on all the tracks on the recording surface of the disc, and the stop code may be recorded on every second track on the disc, for example.

Figure 4:
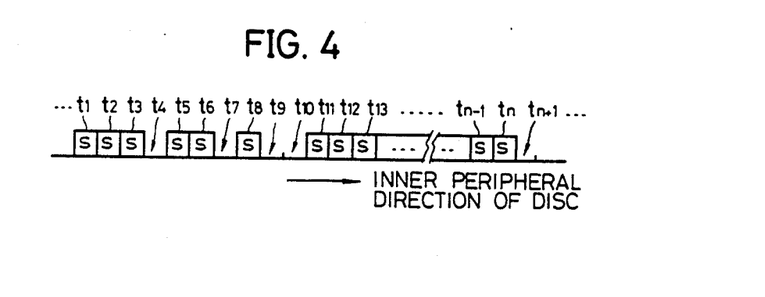
FIG. 4 diagrammatically shows the relationship between tracks recorded with a stop code and not recorded with the stop code.

FIG. 4 shows a relationship between the tracks recorded with the stop code and the tracks not recorded with the stop code, in an embodiment of a disc according to the present invention. In FIG. 4, the tracks t1 through tn+1 respectively indicate each track arranged and recorded along the radial direction of the disc for every revolution of the disc. A reference character s indicates a track onto which the stop code is recorded together with the video signal and the 2-channel audio signal. As shown in FIG. 4, the tracks t1, t2, t3, t5, t6, t8, and t11 through tn are recorded with the stop code. On the other hand, the tracks t4, t7, t9, t10, and tn+1 are not recorded with the stop code. In addition, the video signal recorded on the track t2 and the adjacent tracks t1 and t3 contains still picture, however, this still picture may be the same or different in these tracks t1 through t3. Similarly, the still picture recorded on the tracks t5 and t6, and the tracks t11 through tn, may be the same or different picture. As described above, the stop code is included within the time address signal and the chapter address signal, and is recorded in a state multiplexed into the m-th (m is a predetermined integer) horizontal scanning period within the vertical blanking period of the video signal. Therefore, the stop code is recorded at four positions for one revolution of the disc, with respect to the disc 20 which is recorded with four fields of video signal and the audio signal for one revolution of the disc.

Next, description will be given with respect to the value of the stop code. Because the audio discrimination codes 23 and 29 comprise two bits as described above, four kinds of information can be discriminated by these codes. However, there are only three kinds of audio signals as described above, that is, the monaural, stereo, and bilingual (here, the term bilingual is not limited to audio information of two languages, but also includes two kinds of mutually different monaural audio information). Thus, one remaining value other than the three values used for discriminating the kinds of audio signals, is used for the stop code.

If the above main information signal is the video signal, 2-channel audio signal, and the like, the disc 20 becomes a video disc. However, in some discs, the information signal comprises a 4-channel digital signal (mainly audio PCM signals), such as in an audio disc. In one type of an audio disc, the 4-channel digital signal comprises a 3-channel digital audio signal and a 1-channel still picture digital signal. On the other hand, in other audio discs, the 4-channel digital signal comprises a 4-channel digital audio signal or two kinds of 2-channel digital audio signals. Hence, in the audio disc, the address signal for indicating the recording position on the disc includes a signal for discriminating the kind of audio disc.

Only the main information signal differ between the video disc and the audio disc, and the audio disc may be reproduced by a video disc reproducing apparatus by additionally providing an adapter in the video disc reproducing apparatus. Accordingly, an address signal discriminator may be used in common between the video disc reproducing apparatus and the audio disc reproducing apparatus, if the values of the audio discrimination codes 23 and 29 are correspondingly selected with the values of the signal for discriminating the kind of signal recorded on the audio disc. Particularly, if the values of the audio discrimination codes 23 and 29 for the case where the audio signal recorded on the video disc is the bilingual audio signal are selected so as to correspond to values of the discrimination signal for the case where the digital signal recorded on the audio disc comprises two kinds of 2-channel digital audio signals, a selection switch provided on the reproducing apparatus for selecting one source from the bilingual signal and a switch provided on the reproducing apparatus for selecting one kind of digital audio signal from the two kinds of 2-channel digital audio signals may be used in common. Moreover, if the above address signal discriminator is constructed from a microcomputer is such a case, the number of output ports required is reduced.

By taking the above into consideration, the values of the audio discrimination codes 23 and 29, and the values of the discrimination signal for discriminating the kind of signal recorded on the audio disc, are respectively selected as shown in the following table in the present embodiment of the invention.

TABLE

| CODE VALUE | DISC VIDEO DISC | AUDIO DISC |
| --- | --- | --- |
| 0 0 | Monaural | 3-ch Audio |
|  |  | 1-ch Still picture |
| 0 1 | Stereo | 4-ch Audio |
| 1 0 | Bilingual | 2-ch Audio |
|  |  | 2-ch Audio |
| 1 1 | Stop | — |

Accordingly, as shown in the above table, the audio discrimination codes 23 and 29 are used as the stop code when these codes respectively assume a value "1, 1".

Figure 5:
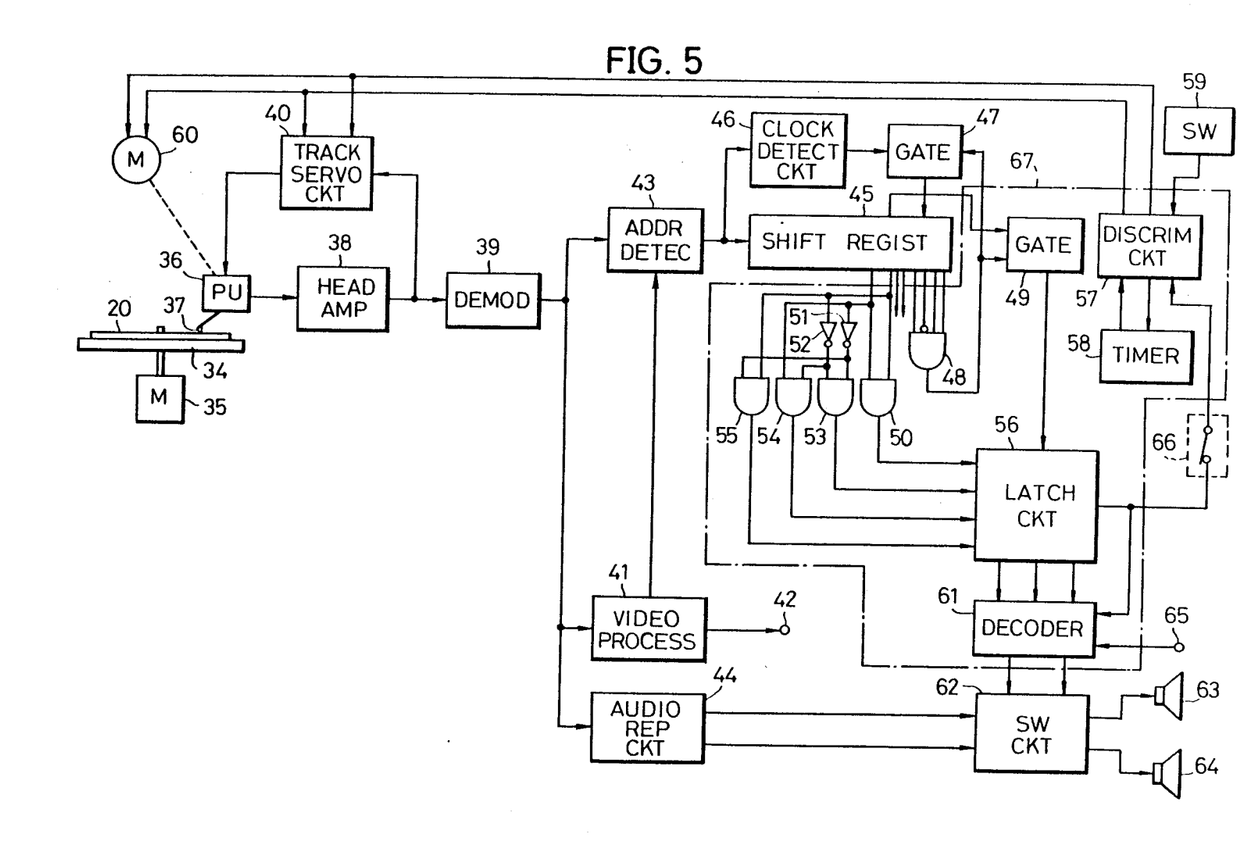
FIG. 5 is a systematic block diagram showing an embodiment of a reproducing apparatus according to the present invention.

Next, description will be given with respect to a reproducing apparatus according to the present invention. In FIG. 5, the disc 20 is recorded with the video signal, the 2-channel audio signal, and the address signal, as described above, and the stop code is recorded on one or more tracks on the disc. The disc 20 is placed onto a turntable 34 and is rotated therewith at a high speed by a motor 35.

A signal pickup device 36, used as a reproducing transducer, has a reproducing stylus 37. The reproducing stylus 37 moves continuously and linearly in a direction from the outer peripheral part to the inner peripheral part of the disc at a speed equal to the distance of one track pitch for one revolution of the turntable 34, during a forward normal reproduction mode. Accordingly, the stylus 37 of the signal pickup device 36 travels radially across the rotating disc 20 and relatively scans over the spiral track on the disc 20.

Figure 6:
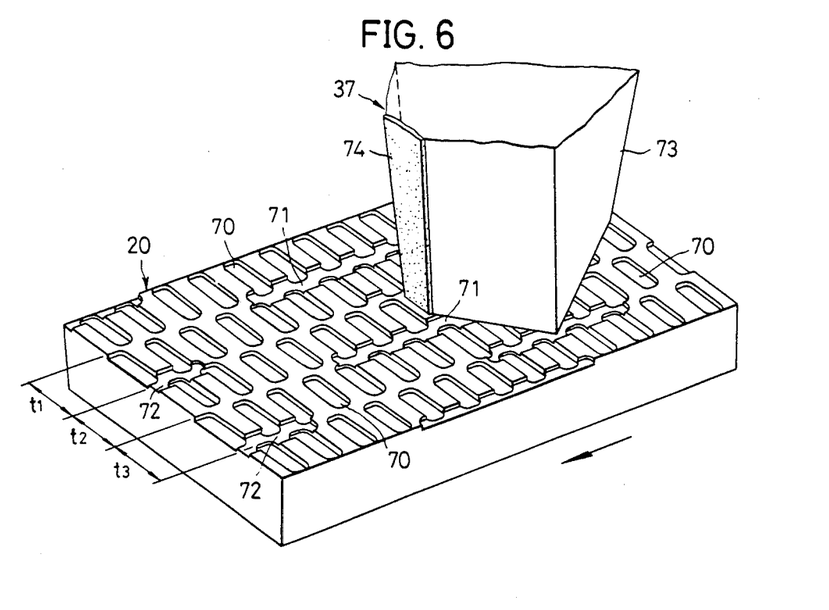
FIG. 6 is a perspective view in an enlarged scale showing a part of a rotary recording medium together with a tip end part of a reproducing stylus.

One part of the track on the disc 20 is shown in an enlarged scale in FIG. 6. In FIG. 6, track turns of a single continuous spiral track, corresponding to each revolution of the disc 20, are designated by t1, t2, t3, . . . . Each track turn is constituted by the formation of pits 70 of a main information signal along a plane track path and has no stylus guide groove formed therein. With respect to one track turn t1, in every horizontal scanning period (1H) at a position corresponding to the horizontal blanking period, pits 71 of the first reference signal fp1 are formed on one lateral side of the track as viewed in the track path direction. Pits 72 of the second reference signal fp2 are formed on the other side of the track.

At an intermediate position between centerlines of adjacent tracks, only pits of either one kind among the above pits 71 and 72 of the above reference signals fp1 and fp2 are formed, and moreover, with respect to one track, the sides on which the pits 71 and 72 are formed are alternated for every track turn. That is, if the pits 71 and 72 are respectively formed on the right and left sides of one track turn, for example, the pits 72 and 71 will respectively be formed on the right and left sides of each of the adjacent track turns.

The tip end of the reproducing stylus 37 has a shape shown in FIG. 6. The reproducing stylus 37 is constituted by a stylus structure 73 having a disc tracing surface which has a width greater than a track width, and an electrode 74 fixed to the rear face of the stylus structure 73. As the reproducing stylus 37 scans and traces over a track on the disc 20 rotating in the direction of an arrow, the video signal recorded thereon by the formation of pits is reproduced as variations in the electrostatic capacitance between the surface of the disc 20 and the electrode 74 of the reproducing stylus 37.

Figure 7:
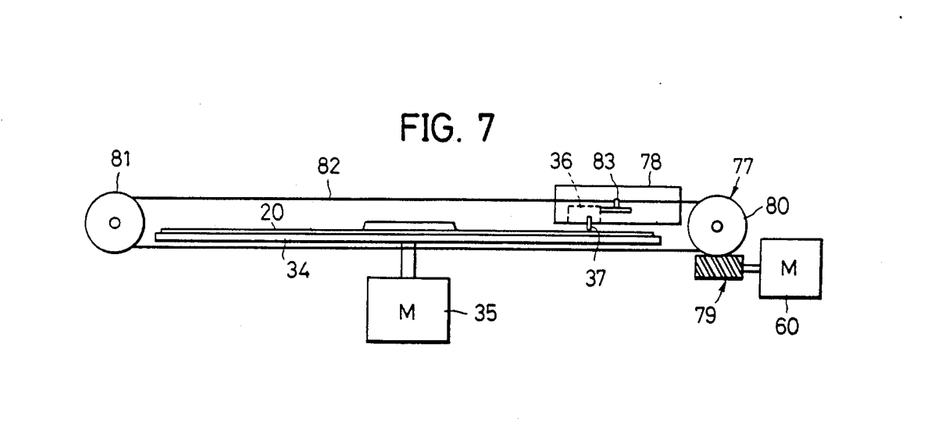
FIG. 7 is a side view showing a feeding mechanism provided with a signal pickup device, in a reproducing apparatus according to the present invention.

The signal pickup device 36 is fed along the radial direction of the disc 20 by a feeding mechanism 77 shown in FIG. 7 which is driven by a feed motor 60. The signal pickup device 36 is mounted to a carriage 78 which is guided by guide rails (not shown). A rope 82 is provided across between a driving wheel 80 which is rotated by the feed motor 60 through a rotation transmitting mechanism 79, and a driven wheel 81. A part of the rope 82 is held by a stud 83 which is fixedly provided on the carriage 78. Accordingly, the driving wheel 80 is rotated by the rotation of the feed motor 60. As the rope 82 moves, the carriage 78 is accordingly moved, and the signal pickup device 36 moves along the radial direction of the disc 20. Upon a forward normal reproduction, tracking control is performed with respect to the reproducing stylus 37 by a tracking control mechanism (not shown) of the signal pickup device 36. Therefore, when the reproducing stylus 37 moves by thirty-two track pitches, the feed motor 60 is supplied with a feed pulse and rotated by an angle according to the pulse width of that feed pulse. Moreover, the signal pickup device 36 is transferred together with the carriage 80, so that the shift of thirty-two track pitches between the reproducing stylus 37 becomes zero.

In FIG. 5, the signal reproduced from the disc 20 as minute variations in the electrostatic capacitance by the reproducing stylus 37 of the signal pickup device 36, is supplied to a preamplifier 38. This preamplifier 38 comprises a resonant circuit which is varied of the resonance frequency according to the above variations in the electrostatic capacitance, and forms the signal supplied thereto into a signal of a predetermined level. An output of the preamplifier 38 is supplied to a demodulating circuit 39 wherein the main information signal is demodulated into a multiplexed signal equal to the output multiplexed signal of the above described mixing circuit 17. On the other hand, the reproduced signal is also supplied to a tracking servo circuit 40 wherein frequency selection is performed to obtain the first through third reference signals fp1 through fp3 within the reproduced signal. A tracking error signal is thus formed according to the relative level difference between the detected reference signals fp1 and fp2. This tracking error signal having a polarity in accordance with the direction of the tracking error, and a level in accordance with the quantity of the tracking error, is supplied to a tracking coil (not shown), to finely shift the reproducing stylus 37 along the track width direction on the disc 20 with a direction and shifting quantity so as to correct the tracking error.

The reproduced multiplexed signal obtained from the demodulating circuit 39 is supplied to a video signal processing circuit 41 wherein the signal is restored into the original video signal, and then obtained through an output terminal 42. The above reproduced multiplexed signal is also supplied to an address signal detection circuit 43 wherein the time address signal shown in FIG. 3A and the chapter address signal shown in FIG. 3B are detected. The reproduced multiplexed signal is also simultaneously supplied to an audio signal reproducing circuit 44 wherein the above described first-channel FM audio signal and the second-channel FM audio signal within the reproduced multiplexed signal are respectively subjected to FM demodulation.

The 29-bit address signal obtained from the address signal detection circuit 43 is supplied to a shift register 45 on one hand, and supplied to a clock reproducing circuit 46 on the other. The clock reproducing circuit 46 generates a clock signal in phase synchronism with the rising edge and the falling edge of the address signal. This clock signal is applied to the shift register 45 as a shift pulse, through a gate circuit 47. When the upper (or most significant) four bits of the shift register 45 assumes the synchronization codes 21 and 27 shown in FIGS. 3A and 3B which are of a known fixed pattern, an AND circuit 48 produces and supplies a synchronization detection signal to the gate circuits 47 and 49. Hence, the gate circuit 47 interrupts the supply of the clock signal to the shift register 45, and stops the shifting of the input data. In addition, the gate circuit 49 produces and supplies a latch pulse to a latch circuit 56.

On the other hand, the data in the 7th bit and 8th bit of the shift register 45, that is, the data in the audio discrimination code 23 or 29, are supplied to a discrimination circuit comprising AND circuits 50, 53, 54, and 55, and inverters 51 and 52. When the stop code is reproduced, the data in the 7th and 8th bits of the shift register 45 respectively become "1". Thus, only the AND circuit 50 among the AND circuits 50, 53, 54, and 55 produces a signal of logic "1" as a stop code detection signal. This stop code detection signal is supplied to the latch circuit 56 wherein the signal is latched. An output stop code detection signal of the latch circuit 56 is supplied to a decoder 61, to effect control so that an audio signal is not produced from a switching circuit 62.

When the data in the 7th and 8th bits of the shift register 45 are "0, 0", only the AND circuit 53 supplied with the output signals of the inverters 51 and 52 produces a signal of logic "1". If the data in the above two bits are "0,1", only the AND circuit 54 produces a signal of logic "1". Further, when the data in the above two bits are "1,0", only the AND circuit 55 produces a signal of logic "1". The logic signal "1" obtained from the AND circuits 53, 54, and 55 are supplied to the latch circuit 56 to be latched, and then supplied to the decoder 61. This decoder 61 generates a 2-bit switching signal for controlling the switching operation of the switching circuit 62. The decoder 61 controls the switching circuit 62 so that the first-channel and second-channel audio signals from the audio signal reproducing circuit 44 are directly supplied to speakers 63 and 64, respectively, when the AND circuit 53 or 54 produces the logic signal "1".

On the other hand, if the AND circuit 55 produces a logic signal "1", the decoder 61 controls the switching circuit 62 so that the signal of the specified channel from among the first-channel and second-channel audio signals obtained from the audio signal reproducing circuit 44 is supplied to both the speakers 63 and 64, according to an output signal of a bilingual selection switch (not shown) which is supplied to an input terminal 65.

Because there is no direct relation between the present invention and detection circuits for the time discrimination codes 24 and 31, chapter number discrimination code 30, track discrimination code 25, and the like within the address signal, and control of the reproducing stylus 37 by outputs of these detection circuits, description will be omitted with respect to these detection circuits and their operations.

When the stop code detection signal is supplied to a discrimination circuit 57, feeding by the feed motor 60 is stopped for a predetermined time (one minute, for example) determined by a timer 58. Moreover, the discrimination circuit 57 simultaneously operates so that the tracking servo circuit 40 generates a pulse for kicking the reproducing stylus 37 once by one track pitch in a direction opposite to the stylus feeding direction upon forward normal reproduction, for every one revolution period of the disc 20. Normally, the kicking position of the reproducing stylus 37 is such that the reproducing stylus 37 is kicked within a vertical blanking period recorded part wherein the reference signal fp3 is recorded. Although the reproducing stylus 37 advances by one track pitch for one revolution of the disc 20 due to the tracking control operation, the reproducing stylus 37 is kicked back by one track pitch by the above described kicking. As a result, the reproducing stylus 37 repeatedly reproduces the track from which the stop code is reproduced, for the above predetermined time period. Hence, a still picture is obtained. During a period in which the still picture is obtained, the audio signal is not reproduced from the speakers 41 and 42.

A stop cancel signal is applied to the above discrimination circuit 57 when the operator pushes a stop cancel button 59. When the stop cancel signal is applied to the discrimination circuit 57, the feeding by the feed motor 60 is immediately started, even when the reproducing stylus 37 is repeatedly reproducing the track from which the stop code is reproduced. Moreover, the generation of the kick pulse by the tracking servo circuit 40 which is applied to the tracking coil, is simultaneously stopped, to effect reproduction of an arbitrary mode (normal reproduction, for example) by the reproducing stylus 37. This reproduction of the arbitrary mode by the reproducing stylus 37, is continued until a main track recorded with the stop code is reproduced immediately following reproduction of a main track not recorded with the stop code.

Accordingly, when a disc recorded with the stop code as shown in FIG. 4 is reproduced, the reproducing apparatus shown in FIG. 5 repeatedly reproduces the track t1 indicated in FIG. 4 for the predetermined time period. Then, the reproducing stylus 37 is automatically shifted to the track t2. Because this track t2 is also recorded with the stop code, this track t2 is also repeatedly reproduced for the predetermined time period. The succeeding track t3 is similarly repeatedly reproduced for the predetermined time period. Thereafter, normal reproduction is performed with respect to the track t4 which is not recorded with the stop code. Further, the track t5 is repeatedly reproduced for the above predetermined time period. Thus, if the same video information is recorded in each of the above tracks t1 through t3, the still picture of the same video information is continuously reproduced for a period equal to three times the duration of the above predetermined time period. The maximum repetitive reproducing time for each track is equal to the above predetermined time period. This predetermined time period is selected to a time period such that the wear of the track due to friction introduced between the track and the reproducing stylus 37 which slides over the track does not cause problems, even if the reproducing stylus 37 repeatedly reproduces the same track for the above predetermined time period. Therefore, compared to a case where one track is repeatedly reproduced for a time period equal to three times the above predetermined time period, the extent of the wear in the tracks t1 through t3 is considerably small.

If the above three tracks t1 through t3 are respectively recorded with mutually different video information, the still picture is successively changed over for every predetermined time period.

On the other hand, if the operator pushes the stop cancel button 59 while the track t1 indicated in FIG. 4 is being reproduced repeatedly, for example, the reproducing stylus 37 immediately starts normal reproduction to successively perform normal reproduction with respect to the tracks t2, t3, and t4. Thereafter, the track t5 is repeatedly reproduced for the above predetermined time period. This track t5 corresponds to the track recorded with the stop code immediately following a track (t4) which is not recorded with the stop code. Accordingly, even if the track on the disc 20 is recorded with a still picture information which is to be reproduced repetitively and continuously for a time period longer than the above predetermined time period, normal reproduction can be performed at the operator's will so that the above still picture information is reproduced within the above predetermined time period.

When the stop cancel button 59 is pushed once, normal reproduction is also performed with respect to the track recorded with the stop code, until a track recorded with the stop code and immediately succeeding a track not recorded with the stop code is reproduced. In addition, in this case, the audio signal is also reproduced when the track recorded with the stop code is reproduced. However, the output of the decoder 61 at this point in time is maintained to the output in accordance with the values of the audio discrimination codes 23 and 29 immediately before the stop code is reproduced. Thus, the audio signal is reproduced with the maintained audio mode.

A switch 66 may be provided in the transmission path reaching the discrimination circuit 57 from the latch circuit 56, as shown in FIG. 5. By manipulating this switch 66, the operator can selectively effect the above repetitive reproduction of the main track by the detection of the stop code, and reproduction unrelated to the stop code.

Figure 8:
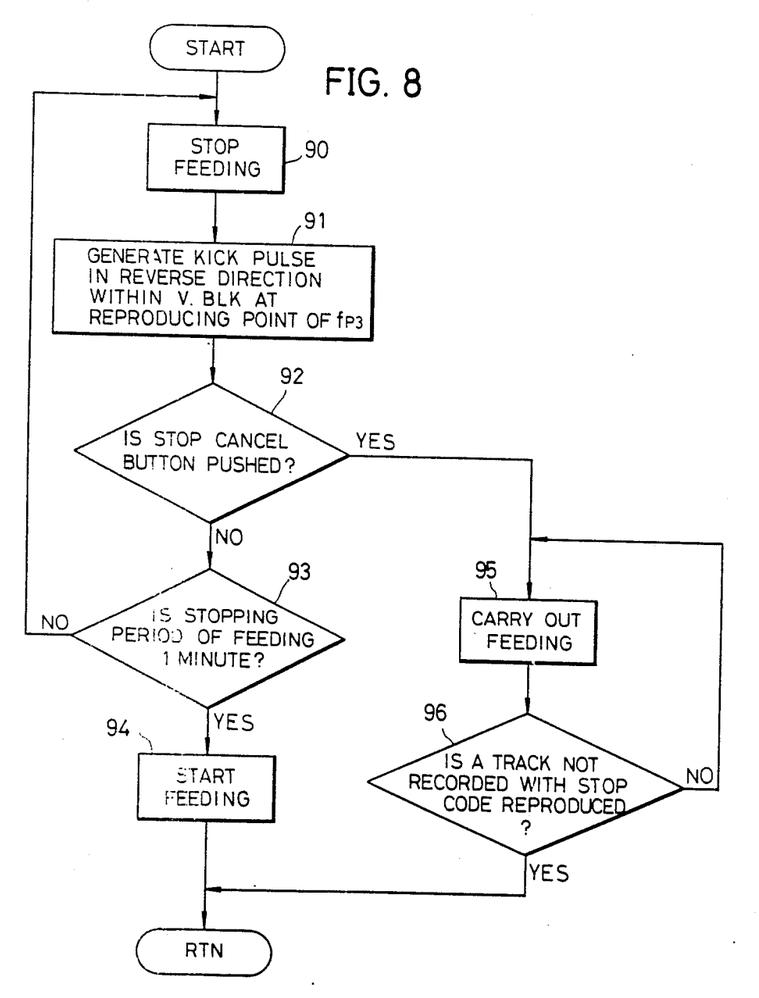
FIG. 8 shows a flow chart for explaining the operation of a micro-computer in a case where a part of a circuit in the block system shown in FIG. 5 is constructed from a micro-computer.

A circuit part 67 surrounded by a one-dot chain line in FIG. 5 may be constructed from a micro-computer. When the micro-computer detects the stop code, the operations indicated in a flow chart shown in FIG. 8 are carried out. In FIG. 8, the feeding by the feed motor 60 is stopped by the detection of the stop code at a step 90. Then, a kick pulse for kicking the reproducing stylus 37 by one track pitch in a direction opposite to the feeding direction upon normal reproduction, is generated within the vertical blanking period (V. BLK) wherein the reference signal fp3 is reproduced, and this kick pulse is supplied to the tracking servo circuit 40 at a step 91. Next, discrimination is made on whether the stop cancel button 59 has been pushed, by the existence or non-existence of a signal from the stop cancel button 59, at a step 92. If it is discriminated that the stop cancel button 59 has not been pushed, the operation is advanced to a step 93. On the other hand, if it is discriminated that the stop cancel button 59 has been pushed, the operation is advanced to a step 95.

The step 93 discriminates whether the period in which the feeding is stopped, has reached a time period of one minute. If the stopping period of feeding is under one minute, the operation is again returned to the step 90. Accordingly, when the stop cancel button 59 is not pushed, the stopping period of the feeding is continued for one minute. The reproducing stylus 37 is thus fed by one track pitch in the opposite (reverse) direction for one revolution of the disc 20, and as a result, the reproducing stylus 37 repeatedly reproduces the same track for one minute.

When the stopping period of the feeding reaches one minute, the operation is advanced to a step 94 shown in FIG. 8. The feeding is started at the step 94, and the stop code is detected thereafter. On the other hand, when the stop cancel button 59 is pushed, the feeding operation is started at the step 95. A step 96 discriminates whether a track not recorded with the stop code has been reproduced. The feeding is continued if a track not recorded with the stop code is not reproduced, while the stop code detection is again performed when a track not recorded with the stop code is reproduced. It is detected that a track not recorded with the stop code is reproduced, if the audio discrimination codes 23 and 29 of the address signals shown in FIGS. 3A and 3B recorded at four positions for each revolution of the disc never assume the values "1, 1" during one revolution period of the disc.

In the above described embodiments of the invention, description was given with respect to a disc which is recorded with four fields of video signal for one revolution of the disc together with the audio signal. Hence, the stop code was recorded within the vertical blanking periods provided at four positions in one track turn. This arrangement enables stable reproduction of the stop code even when dropouts exist. However, in discs wherein dropouts are not a big problem, the stop code may be recorded at only two vertical blanking period recorded parts among the four vertical blanking period recorded parts, for example. In this case, an audio signal discrimination code may be recorded in the remaining two vertical blanking period recorded parts.

Furthermore, the present invention can also be applied to a disc from which a reflected light or a transmitted light is obtained by using a light beam as the reproducing element to reproduce the signal as variations in the light intensity, and in which the tracking signal is not recorded. In addition, the number of fields for one revolution of the disc is not limited to four.

Further, the present invention is not limited to these embodiments, but various variations and modifications may be made without departing from the scope of the present invention.

What is claimed is:

1. A rotary recording medium having a spiral track formed on a recording surface thereof, said spiral track having an address signal, a reference signal for tracking control and information signals including at least a video signal recorded thereon, said address signal indicating the position of said information signals on said rotary recording medium, said spiral track being made up of a plurality of consecutive track turns, each track turn having four fields of the video signal recorded thereon, specific track turns selected from among said track turns having a stop signal recorded thereon, said stop signal being recorded together with said address signal within each vertical blanking period of the video signal on the specific selected track turns, said reference signal being recorded within one of the vertical blanking periods of the video signal on each of the track turns, whereby the positions of said reference signal are aligned in one radial direction across the rotary recording medium, each of said specific selected track turns terminating at the vertical blanking period having said reference signal recorded therein, said stop signal including a stop code which has a specific common value in each of said specific selected track turns, said stop code exclusively indicating that each of said specific selected track turns can produce a still picture when scanned repeatedly for a predetermined time period.

2. The rotary recording medium claimed in claim 1 in which said predetermined time period is a value such that substantially negligible wear occurs on said specific track turns due to friction caused by repetitive scanning of a reproducing element over said specific track turns.

3. A reproducing apparatus for reproducing recorded signals from a rotary recording medium, said rotary recording medium having a spiral track on a recording surface thereof, said spiral track having an address signal and information signals including at least a video signal recorded thereon, said address signal indicating the position of said information signals on said rotary recording medium, said spiral track being made up of a plurality of consecutive track turns, each track turn having four fields of the video signal recorded thereon, said track turns including specific track turns which have a stop signal recorded thereon, said stop signal being recorded together with said address signal within vertical blanking periods of the video signal, said stop signal indicating that each of said specific track turns is to be scanned repeatedly for a predetermined time period so that a still picture is reproduced from each of said specific track turns, said stop signal being a stop code which is constituted by predetermined bits of said address signal, said reproducing apparatus comprising:

a reproducing element for reproducing the recorded signals from said rotary recording medium by scanning over said spiral track;
address signal detecting means responsive to said reproducing element for detecting said address signal from the reproduced signals;
stop code detecting means responsive to said address signal detecting means for detecting said stop code from among the address signal;
timer means for setting said predetermined time period;
circuit means responsive to said stop code detecting means for causing said reproducing element to repeatedly scan over each of said specific track turns having the stop code recorded thereon, said repeated scanning continuing for said predetermined time period with respect to each of said specific track turns so that a still picture is reproduced from each of said specific track turns; and
manually operated stop cancel button means for supplying a stop cancel signal to said circuit means when the repetitive scanning of one of said specific track turns is to be cancelled,
said circuit means immediately shifting said reproducing element from said one specific track turn to a successive track turn when said predetermined time period elapses or said stop cancel signal is received before said predetermined time period elapses.

4. The reproducing apparatus claimed in claim 3 which further comprises manually operated switch means for blocking the transfer of the detected stop code from said stop code detecting means to said circuit means when each of said specific track turns is to be scanned only once by said reproducing element.

5. A rotary recording medium having a spiral track made up of a plurality of consecutive track turns formed on a recording surface thereof, said spiral track having an address signal, a reference signal for tracking control and information signals including at least a video signal and a plurality of channels of audio signals recorded thereon, said address signal indicating the position of said information signals on said rotary recording medium, said address signal including a two-bit audio discrimination code for indicating the kind of said plurality of channels of audio signals, each of said track turns having four fields of the video signal recorded thereon, specific track turns selected from among said track turns having a stop signal recorded thereon, said stop signal being recorded together with said address signal within each of vertical blanking periods of the video signal on the specific selected track turns, said reference signal being recorded within one of the vertical blanking periods of the video signal on each of the track turns, whereby the positions of said reference signal are aligned along one radial direction of the rotary recording medium, each of said specific selected track turns terminating at the vertical blanking period which has said reference signal recorded therein, said stop signal comprising a stop code which has a specific common value in each of said specific track turns and exclusively indicating that each of said specific track turns can produce a still picture when scanned repeatedly for a predetermined time period said stop code being one of four possible bit combinations of said two-bit audio discrimination code.

* * * * *